(No Model.)
J. HEILRATH.
VEHICLE SPRING.
No. 466,538. Patented Jan. 5, 1892.
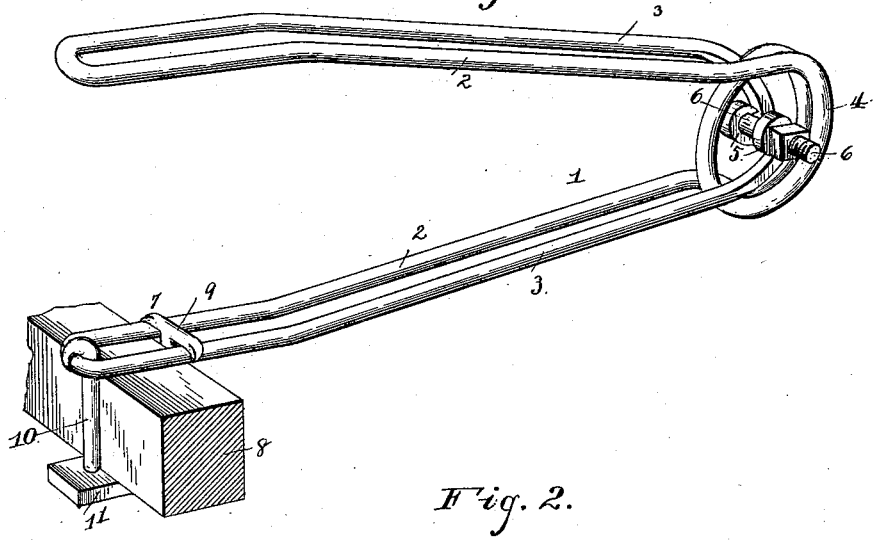
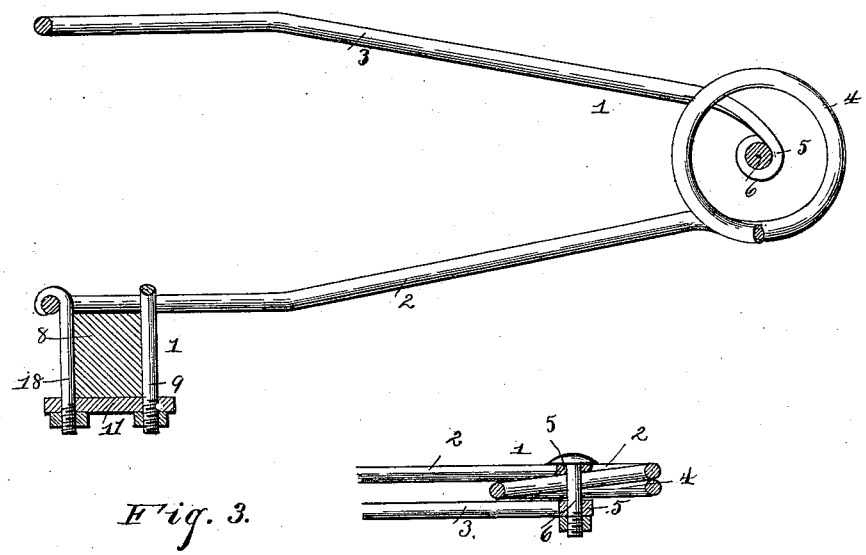
Witnesses
Chas Ford.
H. J. Riley
Inventor
John Heilrath.
By his Attorneys,
C. A. Snow & Co.

United States Patent Office.

JOHN HEILRATH, OF PLYMOUTH, CALIFORNIA.

VEHICLE-SPRING.

SPECIFICATION forming part of Letters Patent No. 466,538, dated January 5, 1892.

Application filed October 8, 1891. Serial No. 408,136. (No model.)

*To all whom it may concern:*

Be it known that I, JOHN HEILRATH, a citizen of the United States, residing at Plymouth, in the county of Amador and State of California, have invented a new and useful Vehicle-Spring, of which the following is a specification.

The invention relates to vehicle-springs.

The object of the present invention is to provide for vehicles of all classes a spring which will be simple and inexpensive in construction, adapted to be readily applied in position, and capable of being employed for supporting both the body and the seat of the vehicle.

The invention consists in the construction and novel combination and arrangement of parts hereinafter fully described, illustrated in the accompanying drawings, and pointed out in the claims hereto appended.

In the drawings, Figure 1 is a perspective view of a spring constructed in accordance with this invention. Fig. 2 is a longitudinal sectional view. Fig. 3 is a detail sectional view.

Referring to the accompanying drawings, 1 designates a semi-elliptical spring constructed of a single piece of spring metal and consisting of arms 2 and a coil 4, connecting the arms. The spring is designed for all classes of vehicles, and it is to be employed for supporting both the body and the seat, and in the accompanying drawings is illustrated one manner of securing the spring to an axle or bar, and two such springs may be employed and arranged to form a complete elliptical spring. Each arm 2 is provided with an integral parallel portion 3, having its outer end arranged opposite the center of the coil 4, and the inner end of the parallel portion is formed integral with the adjacent arm. The parallel portions are arranged on opposite sides of the coil, and their ends, which terminate at the center of the coil, are provided with eyes 5, through which passes a connecting-bolt 6. The parallel portions or extensions 3 form with the arms loops, by means of which the spring may be readily secured by bolts to a body or axle. A clip 7 for securing the spring to an axle 8 is composed of a T-shaped bolt 9, arranged on one side of the axle, and a J-shaped or hooked bolt 10, arranged on the opposite side of the axle, and a tie-plate 11, arranged on the lower face of the axle and connecting the bolts.

It will be seen that a simple, inexpensive, strong, and durable spring is produced which is adapted for use on all classes of vehicles either for supporting the body of the vehicle or the seat. The J-bolt of the clip engages the end of the arm and the T-shaped bolt is arranged between an arm and its parallel portions and engages both of those parts, both bolts having their ends slightly curved to conform to the configuration of the spring.

What I claim is—

1. A semi-elliptical spring constructed of a single piece of spring metal and composed of arms, a coil connecting the arms, and parallel portions 3, formed integral with the arms and having their outer ends terminating at the center of the coil, said portions 3 forming with the arms loops, substantially as and for the purpose described.

2. A semi-elliptical spring constructed of a single piece of spring metal and composed of diverging arms, a coil connecting the arms, and portions 3, formed integral with the arms and arranged parallel with the same and located on opposite sides of the coil and having their outer ends terminating at the center thereof, and a bolt connecting the outer ends of the portions 3, substantially as described.

3. The combination, with a semi-elliptical spring consisting of arms having loops and a coil connecting the arms, of a clip composed of a tie-plate, a T-shaped bolt, and a J-shaped bolt, substantially as described.

In testimony that I claim the foregoing as my own I have hereto affixed my signature in the presence of two witnesses.

JOHN HEILRATH.

Witnesses:
F. H. THOMS,
J. M. WOODS.